(12) United States Patent
Spini et al.

(10) Patent No.: US 9,397,573 B2
(45) Date of Patent: Jul. 19, 2016

(54) INTEGRATED CIRCUIT FOR CONTROLLING A SWITCH OF A CURRENT PATH WITH LEADING EDGE BLANKING DEVICE OF THE CURRENT SIGNAL

(71) Applicant: STMicroelectronics S.r.l., Agrate Brianza (IT)

(72) Inventors: Claudio Spini, Monza (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 471 days.

(21) Appl. No.: 13/666,853

(22) Filed: Nov. 1, 2012

(65) Prior Publication Data

US 2013/0057323 A1     Mar. 7, 2013

Related U.S. Application Data

(63) Continuation-in-part of application No. PCT/EP2011/056956, filed on May 2, 2011.

(30) Foreign Application Priority Data

May 4, 2010    (IT) .............................. MI2010A0778

(51) Int. Cl.
H02M 3/335    (2006.01)

(52) U.S. Cl.
CPC ...... *H02M 3/33507* (2013.01); *H02M 3/33515* (2013.01); *H02M 3/33553* (2013.01)

(58) Field of Classification Search
CPC ..................... H02M 3/33538; H02M 3/33546; H02M 3/33515; H02M 3/33576; H02M 3/33592; H02M 3/33553; H02M 3/33507; H02M 3/33523; H02M 1/32; H02M 1/34; H02M 7/48; H02M 3/28; H02M 3/315; H02M 7/515; H02M 7/53; H02M 7/537; H02M 7/538466; H02M 7/53862; H02M 7/757; H02M 7/79; H02M 3/10; H02M 3/073; H02M 3/135; H02M 3/137; H02M 7/10; H02M 7/217; H02M 7/219; H02M 3/3155; H02M 3/325; H02H 7/1222
USPC ............ 363/21.04, 21.05, 21.1, 21.12, 21.13, 363/21.18, 56.03, 56.09, 56.1, 56.12, 95, 363/97, 123, 124, 127, 131
See application file for complete search history.

(56) References Cited

U.S. PATENT DOCUMENTS

| | | | |
|---|---|---|---|
| 5,418,410 A | | 5/1995 | Tisinger |
| 6,144,245 A | * | 11/2000 | Balogh .......................... 327/380 |
| 6,219,262 B1 | | 4/2001 | Burgyan |

(Continued)

*Primary Examiner* — Jeffrey Gblende
(74) *Attorney, Agent, or Firm* — Seed IP Law Group PLLC

(57) ABSTRACT

An integrated control circuit of a switch is described, which is adapted to open or close a current path; said integrated circuit includes a comparator to compare a first signal with a second signal representative of the current flowing through said current path. The comparator outputs a third variable signal between a low logic level and a high logic level according to whether said second signal is lower than said first signal or vice versa; the integrated circuit has a driver to generate a signal to drive said switch in response to the third signal, and is configured to detect a spike on the leading edge of said second signal and to blank said third signal for a first blanking time period which depends on a turn-on delay of said switch and a second blanking period which depends on the duration of said spike on the leading edge of said second signal.

33 Claims, 7 Drawing Sheets

(56) References Cited

U.S. PATENT DOCUMENTS

| | | |
|---|---|---|
| 7,151,679 B2 | 12/2006 | Strijker |
| 2004/0136206 A1 | 7/2004 | Kinoshita et al. |
| 2005/0078493 A1 | 4/2005 | Kim et al. |
| 2005/0099226 A1* | 5/2005 | Risbo et al. .................. 330/10 |
| 2008/0116870 A1* | 5/2008 | Lin ............................... 323/282 |
| 2008/0170419 A1* | 7/2008 | Lin ............................... 363/20 |
| 2009/0015228 A1* | 1/2009 | Sato et al. .................... 323/283 |
| 2009/0147548 A1 | 6/2009 | Chang et al. |
| 2010/0007409 A1 | 1/2010 | Wang et al. |
| 2010/0008106 A1 | 1/2010 | Kawabe et al. |
| 2010/0237837 A1* | 9/2010 | Wang et al. ................. 323/234 |

\* cited by examiner

INTEGRATED CIRCUIT FOR CONTROLLING A SWITCH OF A CURRENT PATH WITH LEADING EDGE BLANKING DEVICE OF THE CURRENT SIGNAL

BACKGROUND

1. Technical Field

The present disclosure relates to an integrated control circuit for a switch of a current path with a leading-edge blanking device of the current signal.

2. Description of the Related Art

In switching converters and other circuits employing switching power transistors, the operation of the circuit often depends on the current flowing through said transistors.

For example, in switching converters using the control mode referred to as "peak current mode" or "current programming mode", the turn-on of the power transistor is controlled by a clock signal (for example, generated by a local oscillator or related to a particular event in the power circuit), while the turn-off is determined by the current flowing through said transistor reaching a threshold level. Furthermore, most switching converters have protection circuits that turn off the power transistor if the current through the transistor is excessive, to avoid damage to the converter. For example, FIG. 1 shows the block circuit scheme of a typical, commercially available integrated control circuit of the peak current mode type, included in a typical converter. Example waveforms of the control circuit of FIG. 1 are shown in FIG. 2. The integrated control circuit 1 is adapted to control the gate terminal of a transistor MOS M1 where a current Ip flows. The integrated control circuit 1 receives the current signal $I_f$ generated by the feedback block 2. The current $I_f$ is a function of the output voltage Vout. The current $I_f$ is sunk from an input of the integrated control circuit 1, resulting in the generation of the error signal Ve. The error signal Ve is applied to the inverting terminal of the PWM comparator 4 having, on the non-inverting input, the voltage Vcs developed by the current Ip across the resistance Rs, connected between the source of transistor M1 and ground GND. The output of comparator 4 is the reset input R of the PWM latch 5 having, on a set input S, a clock signal CLOCK. The output Q of the PWM latch is connected to the input of a driver 6 that drives the gate terminal of transistor M1 with the signal G. Vdrain is the voltage between the drain terminal of transistor M1 and ground GND; Is is the current flowing on the secondary side of the transformer T, whereas the current Ip flowing through M1 flows through the transformer primary side.

The resistor Rs placed between the source terminal of M1 and ground GND converts the level of said current Ip into a voltage signal Vcs that is provided to the control and/or protection circuits in FIG. 1.

BRIEF SUMMARY

In an embodiment, an integrated circuit for controlling a switch of a current path with a device for blanking the leading edge of the current signal facilitates setting the duration of the blanking period close to an ideal need of the circuit.

In an embodiment, an integrated circuit for controlling a switch adapted to open or close a current path, comprises means of comparison adapted to compare a first signal and a second signal representative of the current flowing through said current path, said means of comparison being adapted to output a third variable signal between a low logic level and a high logic level according to whether said second signal is lower than said first signal or vice versa. Said integrated control circuit comprises first means adapted to output a driving signal to close or open said switch in response to said third signal, characterized in that it comprises second means configured to detect a spike on the leading edge of said second signal and to blank said third signal for a first blanking time that depends on the turn-on delay of said switch and a second blanking time that depends on how long the spike exceeds said first signal.

In an embodiment, an integrated circuit comprises: a comparator configured to compare a first signal with a second signal representative of a current flowing through a current path, and to output a third signal variable between a low logic level and a high logic level based on the comparison; a driver stage configured to output a driving signal based on said third signal and configured to couple to a switch of the current path; and a blanking device coupled between the comparator and the driver stage and configured to: mask the third signal for a first time period when a switching cycle begins; detect spikes on a leading edge of said second signal based on the third signal; and selectively mask said third signal for a second time period when a spike is detected. In an embodiment, the blanking device is configured to mask said third signal for the second time period when said blanking device detects a spike on the leading edge of said second signal within said first time period. In an embodiment, the blanking device is configured to detect a spike on the leading edge of said second signal when, within said first time period, said third signal goes up from the low logic level to the high logic level. In an embodiment, said switch is a power transistor. In an embodiment, the blanking device is configured to limit a number of time periods of masking of the third signal in each switching cycle to the first and the second time periods. In an embodiment, said first time period has a duration based on an estimated maximum turn-on delay. In an embodiment, said second time period has a duration given by a duration of the detected spike. In an embodiment, the blanking device is configured to start the first time period in response to a clock signal. In an embodiment, said second time period has a maximum duration equal to said first time period. In an embodiment, the blanking device comprises: a set reset flip-flop configured to receive said clock signal at a set input; an AND gate configured to receive an output from the set reset flip-flop and said third signal; an OR gate configured to receive said clock signal and an output from said AND gate; and a monostable device of the retriggerable type coupled to an output of the OR gate and configured to trigger the first time period and selectively trigger the second time period in each switching cycle. In an embodiment, the blanking device comprises: a first monostable device of a non-retriggerable type configured to trigger the first time period; and a second monostable device of the non-retriggerable type configured to trigger the second time period, said first time period having a duration different from a duration of said second time period. In an embodiment, the blanking device is configured to trigger said first time period when said driving signal has a positive edge. In an embodiment, the blanking device comprises: an AND gate configured to receive an inverse of an output from the first monostable device of the non-retriggerable type and said third signal, wherein the first monostable device is configured to activate in response to a positive edge of said driving signal, and the second monostable device of the non-retriggerable type is configured to activate in response to a positive edge of an output of the AND gate; and control logic configured to receive signals output from the first monostable device of the non-retriggerable type and from the second monostable device of the non-retriggerable type, and to generate a mask of the third signal in each switching cycle based on the output signals of the first monostable device and the second monostable device. In an embodiment, the control logic is configured to receive the third signal and to generate the mask of the third signal based on the output signals of the first monostable device, the output of the second monostable device and the third signal. In an embodiment, the second time period has a duration based on an estimated maximum duration of a spike. In an embodiment, the first time period has a fixed duration based on an estimated maximum duration of a turn-on time period and the second time period has a duration substantially equal to a duration of the detected spike. In an embodiment, the first and second time periods overlap. In an embodiment, the switch is a power transistor of a switching power supply having an input voltage and an output voltage, the current of said current path being proportional to a rectified input voltage and said first signal being proportional to an error voltage between a reference voltage and a feedback voltage which is representative of the output voltage.

In an embodiment, a system comprises: a rectifier configured to rectify alternating current signals; a power transistor configured to open and close a current path coupled to the rectifier; an output; and a controller, the controller including: a comparator configured to compare a first signal representative of a voltage error of the output with a second signal representative of a current flowing through the current path, and to generate a third signal having a logic level based on the comparison; a driver stage configured to output a driving signal for the power transistor based on said third signal; and a blanking device coupled between the comparator and the driver stage and configured to: mask the third signal for a first time period when a switching cycle begins; detect spikes on a leading edge of said second signal based on the third signal; and selectively mask said third signal for a second time period when a spike is detected. In an embodiment, said first time period has a fixed duration longer than an estimated maximum turn-on time of the power transistor. In an embodiment, the second time period has a duration given by a duration of the detected spike.

In an embodiment, a device comprises: means for comparing a first signal to a second signal and generating a logic signal based on the comparison, the second signal being representative of a current through a current path; means for driving a switch in the current path based at least in part on the logic signal; and means for masking the logic signal coupled between the means for comparing and the means for driving, wherein the means for masking masks the logic signal for a turn-on-time-period when a switching cycle begins and selectively masks the logic signal for a spike-time-period when a spike is detected. In an embodiment, the means for masking includes means for detecting a spike. In an embodiment, said turn-on-time-period has a fixed duration longer than an estimated maximum turn-on time of the switch. In an embodiment, said spike-time-period has a fixed duration based on an estimated maximum duration of a spike. In an embodiment, said spike-time-period has a duration given by a duration of a detected spike.

In an embodiment, a method comprises: comparing a first signal to a second signal, generating a logic signal, the second signal being representative of a current through a current path; generating a driving signal to drive a switch in the current path based at least in part on the logic signal; masking the logic signal for a turn-on-time-period in each cycle of the switch; and selectively masking the logic signal for a spike-time-period based on the logic signal, wherein the comparing, the generating the driving signal and the masking are performed by one or more electronic devices. In an embodiment, said turn-on-time-period has a fixed duration longer than an estimated maximum turn-on time of the switch. In an embodiment, the masking the logic signal in each switching cycle is limited to one turn-on-time-period and one spike-time-period. In an embodiment, said spike-time-period has a fixed duration based on an estimated maximum duration of a spike. In an embodiment, said spike-time-period has a duration given by a duration of a detected spike.

BRIEF DESCRIPTION OF THE SEVERAL VIEWS OF THE DRAWINGS

Example features and advantages of various embodiments will become apparent from the following detailed description of example embodiments thereof, shown by way of non-limiting examples in the accompanying drawings, in which:

FIG. 8 shows some example time diagrams of signals related to the circuit in FIG. 5, which the device in FIG. 7 is applied to;

DETAILED DESCRIPTION

Figure 1:
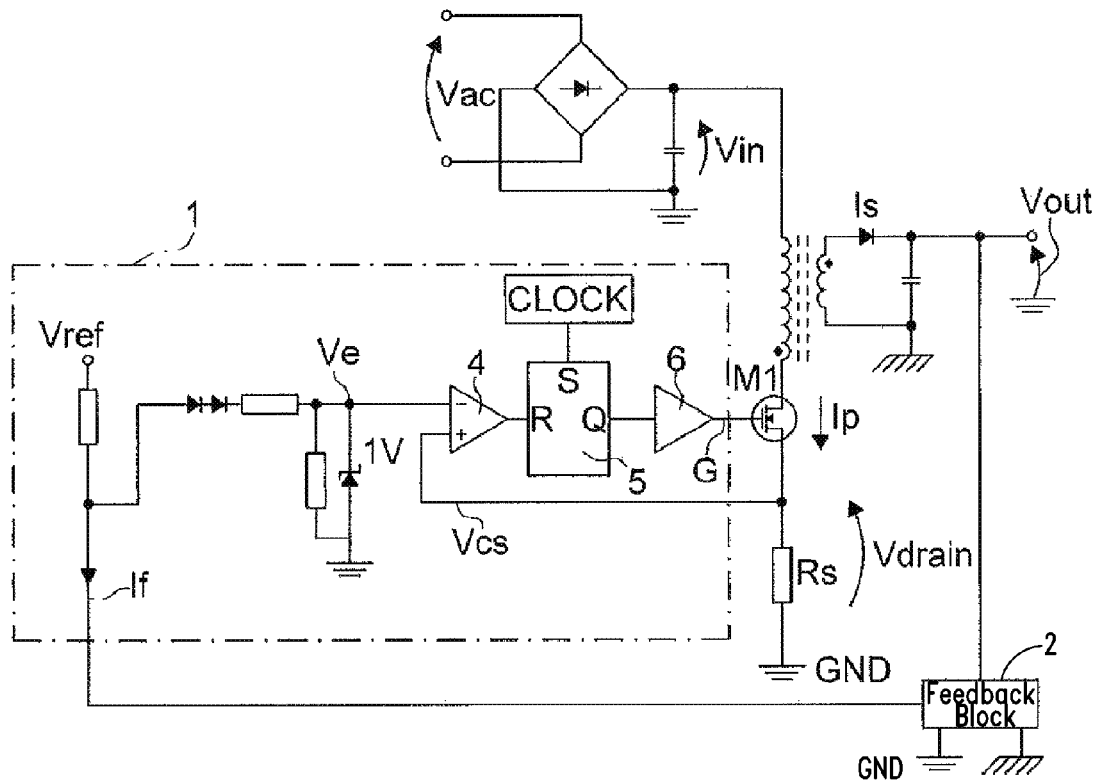
FIG. 1 shows a circuit for controlling a switching converter in accordance with the known art.
Figure 2:
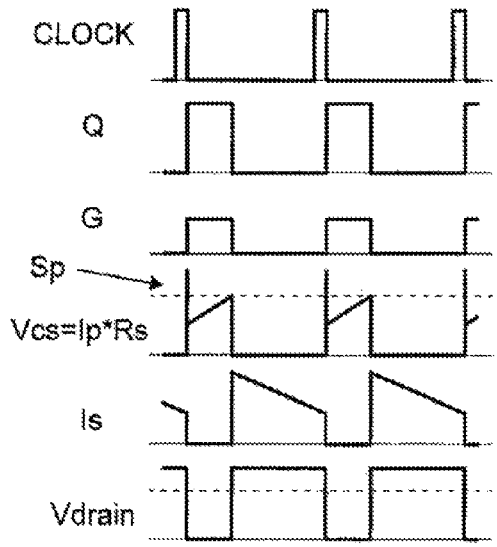
FIG. 2 shows some time diagrams of signals related to the circuit in FIG. 1.

In the following description, certain details are set forth in order to provide a thorough understanding of various embodiments of devices, methods and articles. However, one of skill in the art will understand that other embodiments may be practiced without these details. In other instances, well-known structures and methods associated with, for example, power transistors, error amplifiers, comparators, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claims.

The sizes and relative positions of elements in the drawings are not necessarily drawn to scale. For example, the shapes of various elements and angles may not drawn to scale, and some of these elements may be enlarged and positioned to improve drawing legibility. Further, the particular shapes of the elements as drawn are not necessarily intended to convey any information regarding the actual shape of particular elements, and have been selected solely for ease of recognition in the drawings. References, such as geometric or other references, are not intended to refer to ideal embodiments.

A problem of the circuits whose operation is based on sensing the current Ip flowing through a power transistor is that spurious signals Sp actually not representing the current to be controlled can cause false activations of the comparison and/or protection circuits that sense said current.

A condition of this type may occur for a short time interval immediately after turning on the power transistor, that is, on the leading edge of the current signal Ip. For several reasons, such as parasitic capacitance discharge, reverse recovery of rectifier diodes in the power circuit, etc., there are typically spikes Sp superimposed on the leading edge of the current signal Ip. The duration of such spikes is typically short but the amplitude of the spikes may be significantly higher than the operating amplitude of the current signal Ip. These spikes Sp may trigger a premature end of the conduction period of the power transistor, which might cause the converter to operate irregularly.

The problem of the spikes Sp on the leading edge of the current signal is typically addressed in two different manners.

The first approach is that of filtering, typically achieved by using a low pass RC circuit between the current sensing resistor Rs and the sensing input of the control device. The time constant of said RC filter should be long enough to reduce the spike amplitude below the peak value of the useful signal. On the other hand, the time constant must not be too long, otherwise the delay introduced (equal to the time constant) on the useful signal risks making the current protection means inefficient in case of an actual overcurrent. Normally this time constant is in the hundred of nanoseconds, but finding the right compromise between the two above-mentioned factors is not always easy. In addition, two additional external components are employed.

Figure 3:
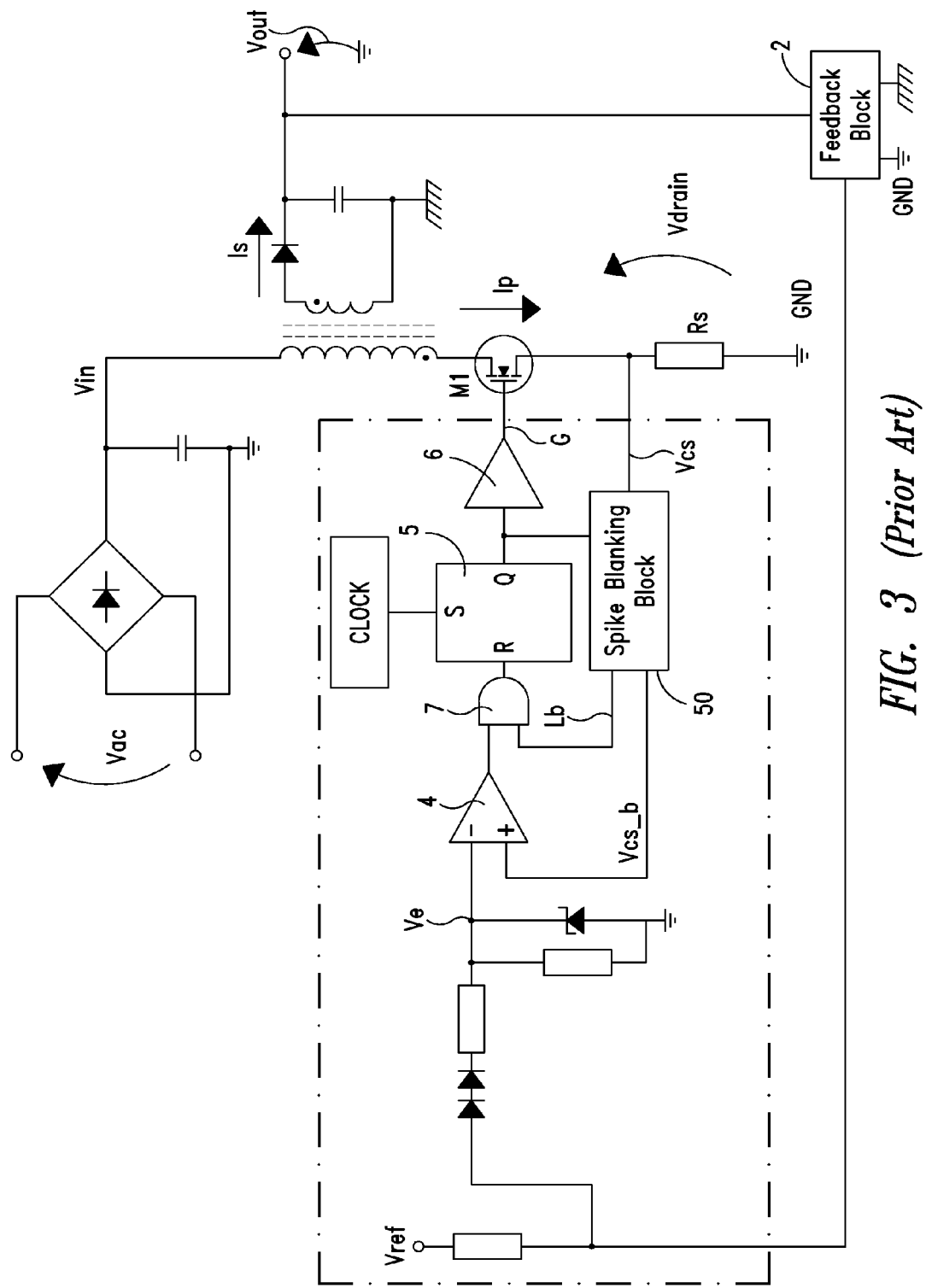
FIG. 3 shows another circuit for controlling a switching converter in accordance with the known art.

The second way is to introduce a spike suppressing circuit on the current sensing input of the control device. A class of such spike suppressing circuits is that commonly referred to as leading edge blanking circuits. FIG. 3 shows the same circuit schematic in FIG. 1 in which the spike blanking block 50 has been added to blank the spikes Sp of the leading edge of the signal Vcs proportional to the current Ip flowing through the power transistor M1 (see FIG. 4). The block 50 blanks the signal Vcs for a blanking period Tleb, thus obtaining a signal Vcs_b. Additionally or alternatively, the AND gate 7, which receives the output of the PWM comparator 4 and the signal Lb output of the block 50 as inputs, prevents the reset signal R of the PWM latch from having a high level in the blanking period Tleb.

Figure 4:
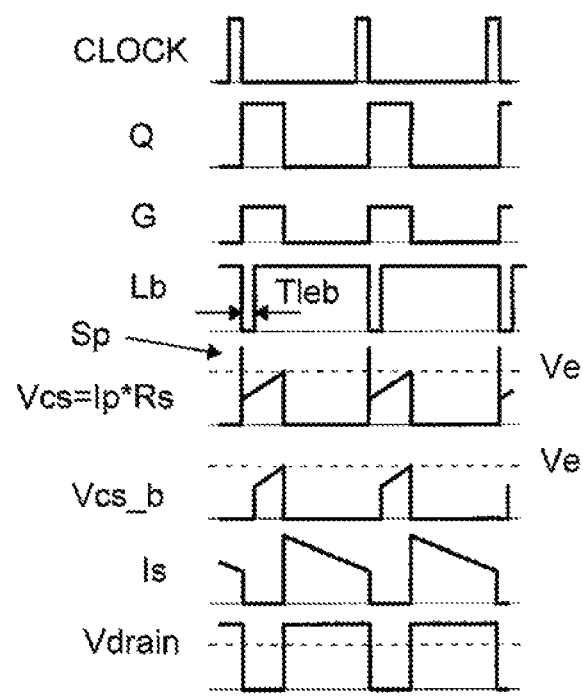
FIG. 4 shows some time diagrams of signals related to the circuit in FIG. 3.

Typically, these circuits are immediately activated before turning on the power transistor and operate so as to blank the signal on the sensing input and/or the output of the circuits processing the sensed signals during a short interval of time following the turn-on. This short time interval is commonly known as the "blanking period". For example, the sensing input might be temporarily kept short-circuited to ground or isolated from the comparison and/or protection circuits downstream, so that they do not receive the spike; or, alternatively or in addition, the output of the comparison and/or protection means may be temporarily masked off so that the circuits downstream the latter do not receive a false signal. FIG. 4 shows examples of the signals related to the circuit in FIG. 3.

The start and the end of the blanking time period are typically determined by a monostable, nonretriggerable multivibrator that provides a pulse having a preset duration. The monostable circuit is activated by the same signal Q that determines the turn-on of the power transistor M1; the monostable circuit determines the blanking period.

This approach is not devoid of problems. A fixed blanking period may severely limit the frequency range where the control device may be used, which might be troublesome in a general purpose device. In fact, considering the tolerance in the duration of the blanking period, the minimum duration should be long enough to blank the spike. On the other hand the maximum duration should not be so long as to significantly reduce the effectiveness of the protection circuits in case of an overcurrent, because of a too long minimum turn-on time of the power transistor.

Another aspect relates to the turn-on delay of the power transistor, which depends on the power transistor itself, the characteristics of the gate driver 6 and also on the interface circuitry between the driving output of the control device and the input terminal of the transistor (the gate of a MOSFET or an IGBT). This delay may be difficult or impossible to predict and may also be adjusted to reduce the electromagnetic noise generated at turn-on. A long turn-on delay can substantially reduce the effective duration of the blanking period.

Other approaches have been proposed to overcome the above-mentioned problems. U.S. Pat. No. 5,418,410 describes a circuit in which the end of the blanking time period is determined by the driving voltage exceeding a determined value such that the power transistor is expected to be fully on and the leading edge spike to be disappeared. It is a form of adaptive leading edge blanking, i.e., which adapts the duration of the blanking period to the characteristics of the power transistor. However, the voltage actually applied to the input terminal of the transistor may not be always sensed (for example, when the transistor is a discrete component outside the control device and the above-mentioned interface circuitry is present). As the voltage on the input terminal of the transistor is always lower than that at the output of the driving circuit, it might result in a blanking period shorter than desired.

In U.S. Pat. No. 6,144,245, a system is described where the blanking period starts when the current sourced by the final driving stage exceeds a determined threshold value and ends when said current falls below that value.

This method forms an adaptive leading edge blanking applicable even if the driving voltage is not directly accessible, but its operation may be affected by the presence of parasitic components (inductance and capacitance) in the circuit where the driving current pulse flows. These parasitic elements may resonate and generate oscillations that may temporarily reduce the driving current below the above-mentioned threshold before the transistor is fully on. This would result in an early ending of the blanking period. Moreover, when driving MOSFETs or IGBTs, it should be ensured that the supply voltage of the driving circuit is significantly higher than the plateau voltage, otherwise a reduction of the driving current below the threshold might occur due to natural loss of current capacity of the driver with low differential voltages.

In U.S. Pat. No. 7,151,679, a circuit with a variable blanking time period is described. The duration is a function of the output load of the converter: it is longer with heavy loads, shorter with lighter loads. The problem in this system is that, at light loads, the reduction of the blanking time period might easily make the blanking ineffective: in fact, in case of a leading edge spike mainly due to the discharge of parasitic capacitance, the duration of said spike is almost independent of the load conditions.

Figure 5:
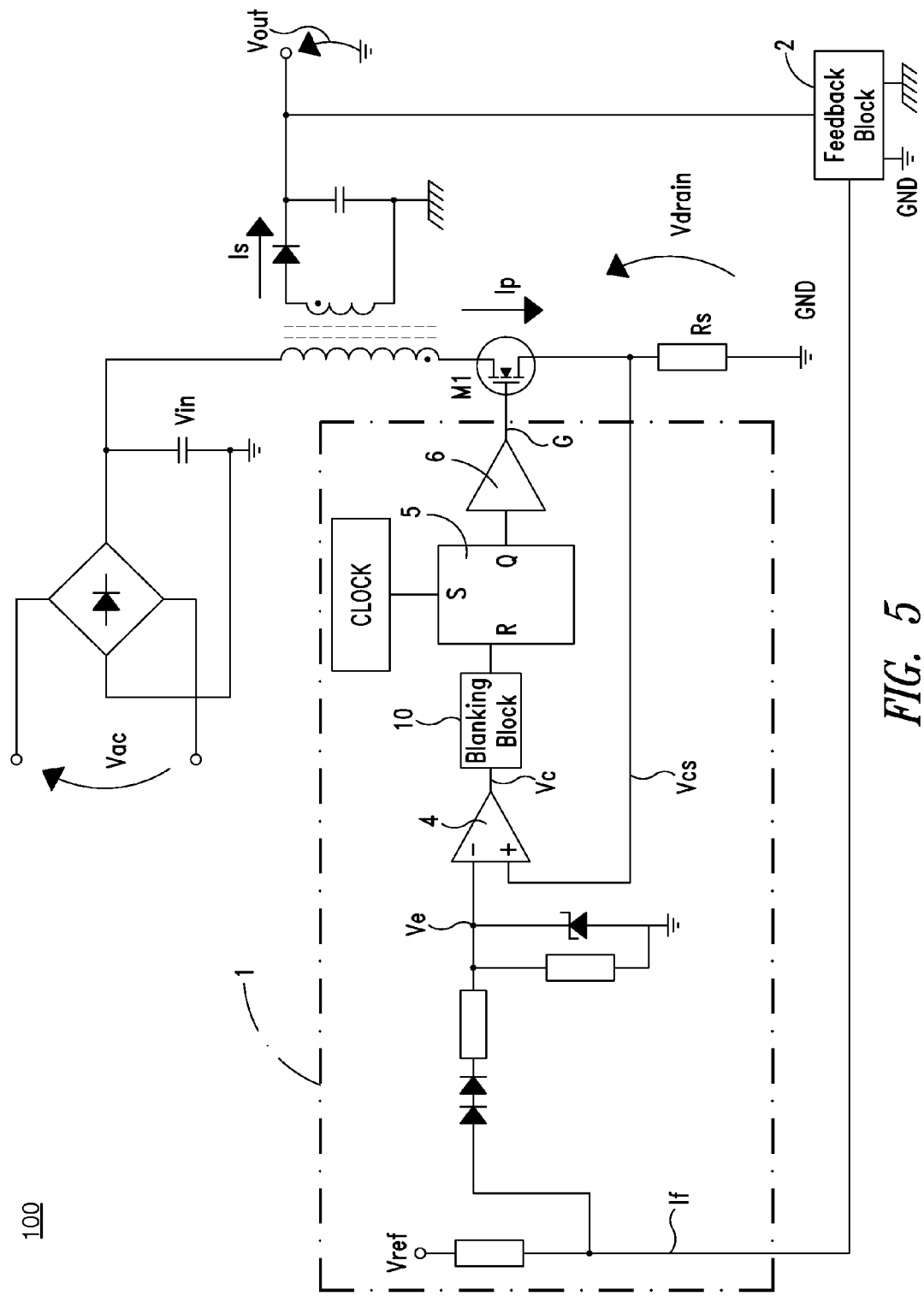
FIG. 5 shows an integrated circuit for controlling a switching converter with the device for blanking the leading edge of the current signal of a power transistor in accordance with an embodiment.

FIG. 5 shows a switching converter 100 including an integrated control circuit 1 for a switch, as illustrated a power transistor M1, adapted to close or open the current path where the current Ip flows. The integrated control circuit 1 comprises a device, as illustrated a blanking block 10 configured to blank the leading edge of the signal Vcs proportional to the current Ip flowing through the power transistor M1.

The integrated circuit 1 comprises a comparator 4 adapted to compare a first signal Ve with a second signal Vcs representative of the current Ip flowing through said current path; the comparator 4 is adapted to output a third signal Vc variable between a low logic level and a high logic level, depending on whether said second signal Vcs is lower than said first signal Ve, or vice versa. The integrated control circuit comprises a driver 6 adapted to output a driving signal G to close or open the power transistor M1 in response to the third signal Vc. Further, it comprises the device 10 adapted to blank the third signal Vc in the presence of a spike Sp on the leading edge of the second signal Vcs occurring within a first time period T1 from the turn-on of M1 and for a time period depending on the duration Tsmax of said spike Sp.

The integrated control circuit 1 is particularly adapted to control the gate terminal of the transistor MOS M1 through which the current Ip flows, which current is proportional to the input voltage Vin which is the rectified voltage Vac. The integrated control circuit 1 receives the current signal $I_f$ generated by the feedback block 2. The current $I_f$ is a function of the output voltage Vout. The current $I_f$ is sunk from an input of the integrated control circuit 1, resulting in the generation of the error signal Ve. The signal Ve is provided to the inverting input of the PWM comparator 4 having, on a non-inverting input, the voltage Vcs developed by the current Ip across the current sensing resistor Rs connected between the source of M1 and ground GND. The output of comparator 4 is the third signal Vc fed to the input of device 10 and the output of device 10 is the reset input R of the PWM latch 5, the PWM latch 5 having the clock signal CLOCK on a set input S. The output signal Q is input to a driver 6, which as illustrated drives the gate terminal of transistor M1 with the signal G. Vdrain is the voltage between the drain terminal of transistor M1 and ground GND; Is is the current flowing on the secondary side of the transformer T, whereas the current Ip flowing through M1 flows through the transformer primary side. The various circuit components of the control circuit 1 may be supplied with a supply voltage equal to or lower than a common supply voltage (not shown) and have circuit parts connected to a ground GND associated with the common supply voltage.

Figure 6:
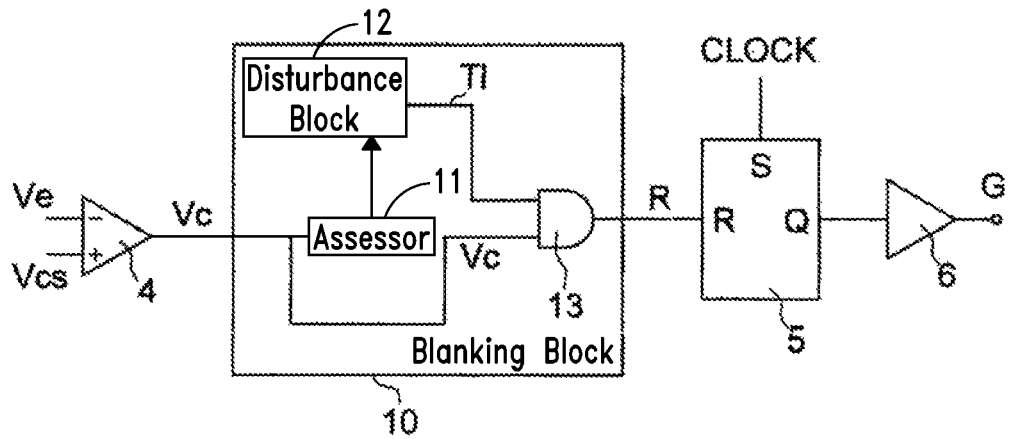
FIG. 6 is a block circuit schematic of a device for blanking the leading edge of the current signal of a power transistor in accordance with an embodiment.

FIG. 6 shows a block schematic of an embodiment of a device 10 for blanking the leading edge of the current signal Ip of the power transistor M1. Said device 10 operates on the output of the PWM comparator 4 and generates the signal R at the reset input of the PWM latch 5. The device 10 comprises accessing logic 11 adapted to assess whether the signal Vc is a meaningful signal or a disturbance such as a spike. Device 10 comprises a disturbance blanker including the block 12 and the AND gate 13 adapted to blank the signal Vc for a blanking period with a signal T1 if the value of the signal Vc is a disturbance and as long as said signal Vc is a disturbance. The signal Vc and the signal T1 are coupled to inputs of the AND gate 13, which is configured to provides the signal R to the PWM latch 5. The signal Vc is a logic signal which is at the high logic level when signal Vcs reaches the signal Ve and is held at the low logic level, i.e., the ground GND, when the signal Vcs is lower than the signal Ve. In the presence of a spike Sp on the leading edge (leading edge spike Sp) of signal Vcs, signal Vc goes to the high logic level for the duration of said spike; this is considered as a disturbance by device 10 and blanked.

Figure 7:
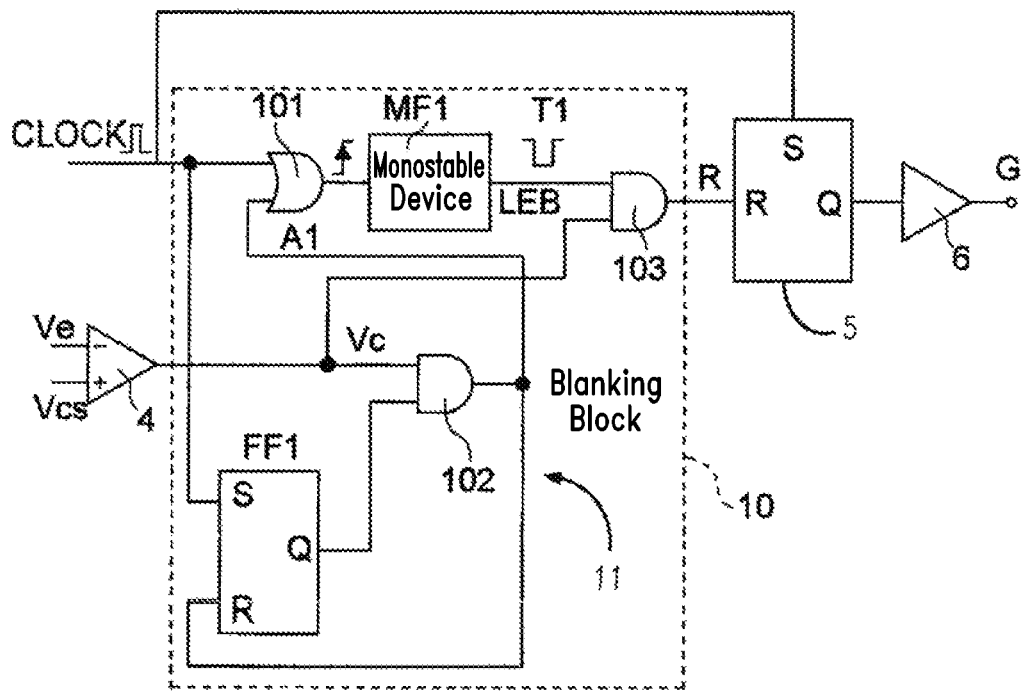
FIG. 7 is a circuit schematic of a device for blanking the leading edge of the current signal of a power transistor in accordance with an embodiment.
Figure 8:
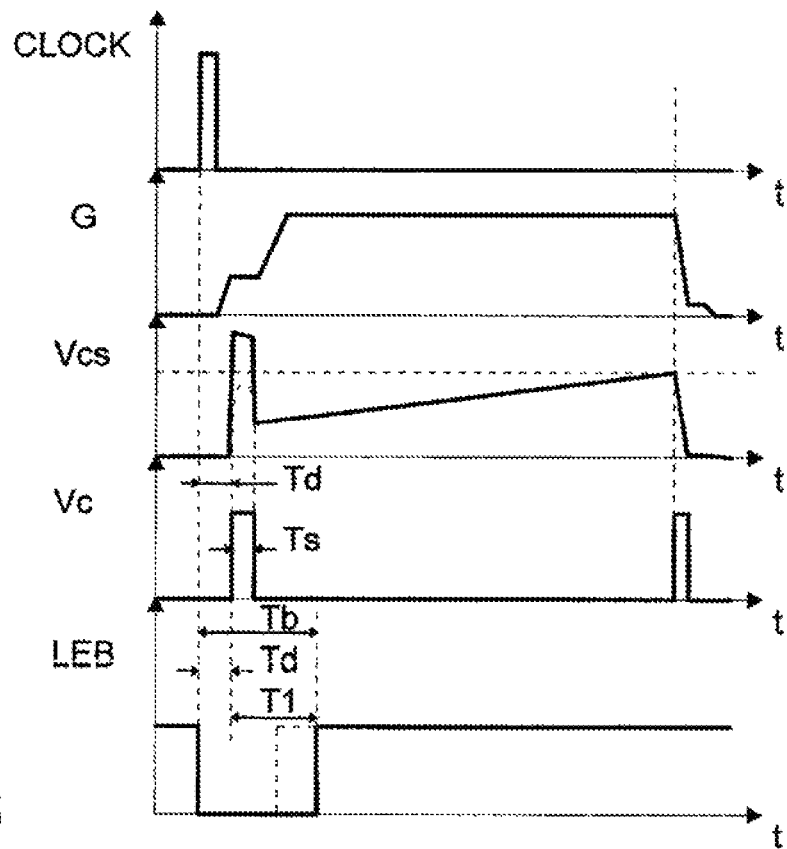

FIG. 7 shows the leading edge blanking device 10 of the current signal of a power transistor in accordance with a first embodiment; FIG. 8 shows the waveforms related to an embodiment of the circuit in FIG. 5 employing an embodiment of the device 10 of FIG. 7.

The signal CLOCK is a very short duration pulse generated by a local oscillator or by another circuit that detects a particular event occurred in the power circuit. As already said, the clock signal is the input signal S of the PWM latch 5 and causes the transistor M1 to turn on. This clock signal goes also to one input of the OR gate 101 and to the set input S of the set-reset flip-flop FF1. The output of the PWM comparator 4 is one input of the two AND gates 102 and 103. The other input of the AND gate 102 is the output Q of the flip-flop FF1, while the output A1 of AND gate 102 is both the reset input R of the flip-flop FF1 and the other input of the OR gate 101. The accessing logic 11 comprises the flip-flop FF1 and the AND gate 102. The output of the OR gate 101 is fed to the monostable MF1 of the retriggerable type, which is sensitive to the positive edges. The output LEB of the monostable MF1 goes low, i.e., to ground GND, for a time T1 fixed with an internal counter when a positive-going edge is applied to its input.

When a CLOCK signal is applied, Vcs is initially zero, so Vc is at the low level, i.e., to the ground GND, and the output of gate 102 is zero. The consequent positive edge of the pulse appearing on the output of the OR gate 101 activates the monostable MF1 and its output LEB goes to the low logic level for the time T1. This time T1 would typically be chosen so as to be certainly longer than the maximum turn-on delay Tdmax of the power transistor M1.

During the time window of duration T1 which is open upon the arrival of the clock pulse CLOCK, the gate 102 allows the signal Vc to pass, if this goes to the high logic level, while the AND gate 103 blocks it towards the reset of the PWM latch. Then, if the leading edge spike Sp present in the signal Vcs has a sufficient amplitude (i.e., it is Vcs≥Ve) it will trigger the PWM comparator 4, at some instant Td≤T1, and, another positive edge will be applied at the input of MF1 through the OR gate 102. Since monostable MF1 is retriggerable, the internal count of monostable MF1 will be reset and the time period T1 of the low output level will be counted again from this instant, extending the blanking of the signal Vc through the gate 103. The time period T1 should also be long enough to cover the maximum duration Tsmax of the leading edge spike, so as to suppress it. During the retrigger operation of monostable MF1, the output of the AND gate 102 resets the flip-flop FF1 and therefore it does not allow the monostable MF1 to be retriggered once more during that switching cycle: in fact, in order to re-enable the retriggering of the monostable MF1, the flip-flop FF1 needs to be set again by the following CLOCK pulse. This function reduces possible bouncing of the signal Vcs due to noise from repeatedly triggering the monostable MF1. Such bouncing might result in very long blanking times which might easily compromise the operation of the whole converter. Therefore, the flip-flop FF1 performs a debouncing action.

When the period Tb=Td+T1 ends, the signal LEB goes to the high level, the blanking of the signal Vc by the AND gate 103 ends and said signal is then able to reset the PWM latch 5 to allow the power transistor M1 to be turned off.

If the leading edge spike Sp is not large enough to trigger the PWM comparator 4, (this is shown by means of dashed lines in FIG. 8) MF1 would not be retriggered and the blanking period would be limited to the first time window T1. Therefore, with this circuit, a variable blanking period may be obtained with continuity between T1 and 2*T1.

The disclosed circuit uses a single blanking period T1 that should be longer than both the maximum turn-on delay Tdmax of the power transistor and the maximum duration Tsmax of the leading edge spike, i.e., T1>max (Td max, Ts max).

This might be a problem in case of large-size power transistors: the turn-on delay might be significantly longer than the duration of the leading edge spike, thus resulting in a too long duration of the blanking period.

Figure 9:
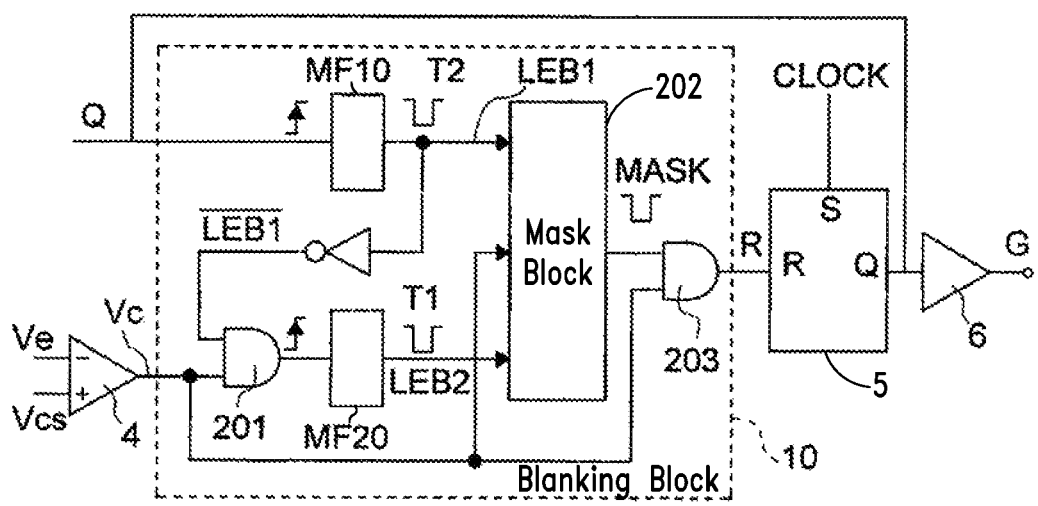
FIG. 9 is a circuit schematic of a device for blanking the leading edge of the current signal of a power transistor in accordance with an embodiment.

FIG. 9 shows the device 10 for blanking the leading edge of the current signal of a power transistor in accordance with a second embodiment.

The signal Q is the output of the PWM latch 5. A high logic level of Q keeps the gate driver 6 on. Therefore when at turn-on, there is a positive edge of the signal Q, the non-retriggerable type monostable MF10, which is sensitive to the positive edges, is activated and its output LEB1 goes low, i.e., to ground GND, for a time period T2. Similarly to the previous circuit of FIG. 7, the time T2 would typically be chosen so as to be certainly longer than the maximum turn-on delay Tdmax of the power transistor M1.

The signal $\overline{LEB1}$, i.e., the negated signal LEB1, is brought to the input of AND gate 201 that receives the signal Vc, output of the PWM comparator 4, on the other input. A time window of duration T2 is therefore defined, during which gate 201 allows the signal Vc to pass, if it goes high. Then, if the leading edge spike Sp in the signal Vcs has a sufficient amplitude, i.e., it is higher than Ve, at some instant Td≤T2 a positive edge will be applied to the input of the non-retriggerable monostable MF20 by means of the gate 201. Since MF20 is sensitive to the positive edges, its output LEB2, will go low for a time T1 long enough to cover the duration of the leading edge spike Sp.

The signals LEB1 and LEB2 are provided to a functional block 202 that may also receive the signal Vc on another input thereof. The block 202 generates the signal MASK that blanks the output Vc of the PWM comparator 4 through the gate 203, thus preventing the PWM latch 5 from being reset for a period Tb. At the end of Tb the signal Vc will be allowed to pass reset the PWM latch 5 and turn off the power transistor M1.

Different criteria for generating the signal MASK are possible, corresponding to different internal configurations of the logic network that processes the signals LEB1, LEB2 and Vc.

Figure 10:
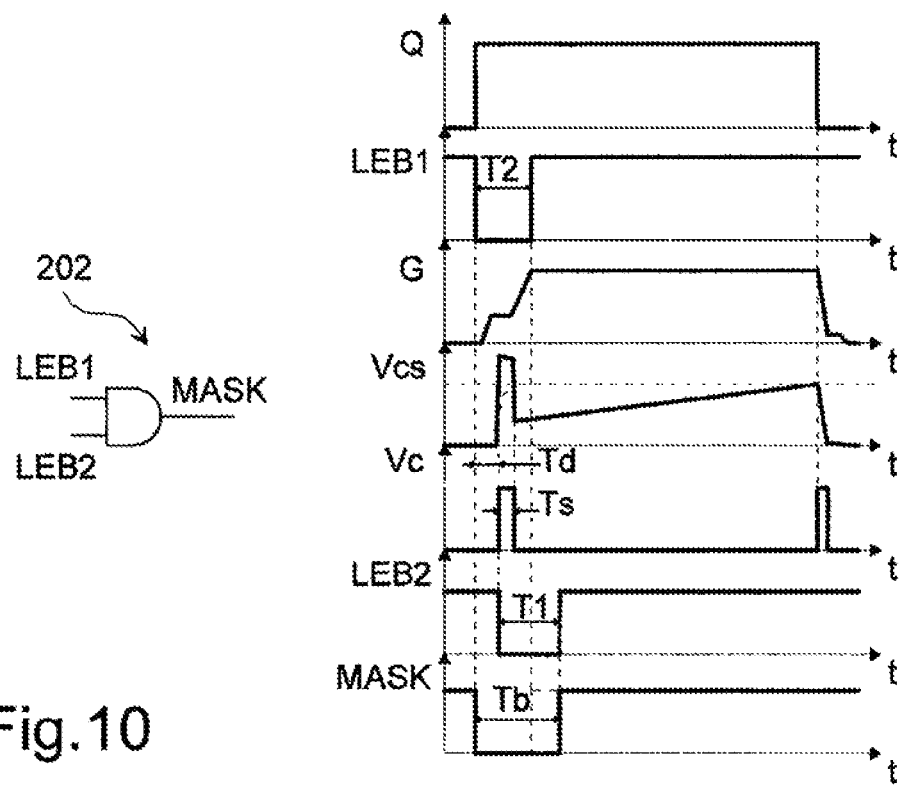
FIG. 10 shows an implementation of the logic circuit of the device in FIG. 9 and some time diagrams of signals related to the circuit in FIG. 5, which the device in FIG. 9 is applied to, with the implementation of the logic circuit.

A first example implementation of the functional block 202 is shown in FIG. 10, along with the waveforms related to its operation once inserted in the circuit in FIG. 5.

In this case, the signal MASK is given by the logic AND of the two signals LEB1 and LEB2. The result is a blanking period Tb=Td+T1 which may change with continuity from a minimum of T2 to a maximum of T1+T2, if said spike is higher than Ve for a sufficient period of time. Therefore: T2≤Tb=Td+T1≤T1+T2.

It is worth noting that, even if the leading edge spike extinguishes within the time period T2, Tb=Td+T1.

As compared to the device 10 of the first embodiment, the advantage is the possibility to separately chose T1 and T2 so as to adapt them to the durations Td and Ts of the two different phenomena that influence their choice: T2>Td max, T1>Ts max.

Figure 11:
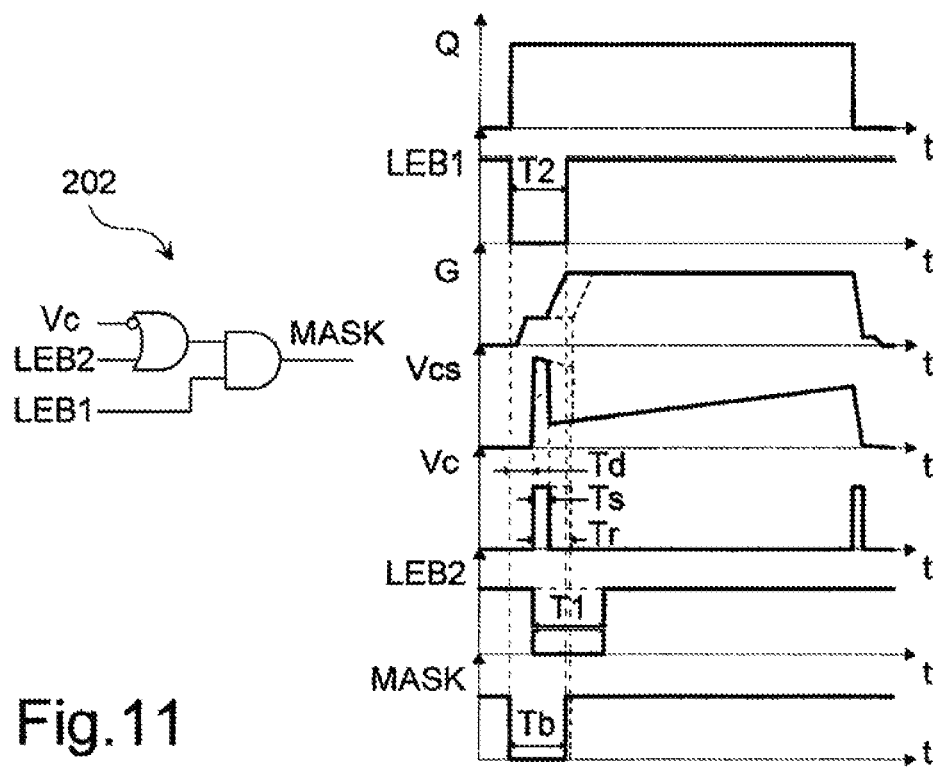
FIG. 11 shows an implementation of the logic circuit of the device in FIG. 9 and some time diagrams of signals related to the circuit in FIG. 5 which the device in FIG. 9 is applied to, with the implementation of the logic circuit.

A second implementation of the functional block 202 is shown in FIG. 11, along with the waveforms related to its operation once inserted in the circuit in FIG. 5.

In this case, the signal MASK is given by the logic AND of the signal LEB1 with the logic OR of the signals $\overline{Vc}$, i.e., the negated Vc signal, and LEB2. The result is a blanking period Tb which will have a minimum value of T2. Again, if the spike Sp extends beyond the time period T2, the duration of the period Tb will extend beyond T2 as long as the signal Vc remains high, i.e., as long as the spike Sp is above the aforesaid trigger level and not beyond and, however, for a duration not longer than the time period T1. Therefore: T2≤Tb=Td+Ts≤T1+T2, with Ts being the duration of the spike Sp, with Ts lower than or equal to Tsmax.

Therefore, also in this case, the maximum duration of Tb is T1+T2; however, the advantage is that, in the intermediate cases, the duration of Tb is sufficient to suppress the spike, without being longer than needed.

It is also worth noting that, the monostables MF1 and MF2 are non-retriggerable, hence possible bouncings on the signal Vcs will not affect the circuit operation. This makes the anti-bouncing flip-flops unnecessary.

Also in this case, T1 and T2 may be chosen so as to adapt them to the maximum durations of Td and Ts: T2>Td max, T1>Ts max.

It is worth noting that, in case of converter overload that brings the current to such a value that the signal Vcs is always above Ve, the minimum turning-on time of the power transistor will be at least Tbmax, that is 2*T1 in the case of the device in FIG. 6, and T1+T2 in the case of the device in FIG. 9 (with both options).

It is also worth noting that, in the example embodiments, the signal Vcs is available at all times, because the operating principle is based on rejecting the disturbances, starting from the effect itself caused by the disturbances.

The effects of reduction in the actual blanking time are reduced by using device 10 downstream of the PWM comparator 4, because of the turn-on delay of the power transistor M1. Further, the duration of the blanking period T1 may be adapted to the need of the circuit. Therefore, the ability of suppressing the leading edge spike may be combined with that of maintaining an efficient limitation of the current passing through the power transistor, even with a relatively high switching frequency. In fact, a short minimum on-time of power transistor M1 can be achieved. Finally, if the amplitude of the leading edge spike Sp is such that it does not cause an unwanted switching of the PWM comparator 4 (which may easily occur if the power transistor works under so-called "soft-switching" conditions at turn-on), the duration of the leading edge blanking is reduced.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit, comprising:
a comparator configured to compare a first signal with a second signal representative of a current flowing through a current path, and to output a third signal based on the comparison;
a driver stage configured to output a driving signal based on said third signal and configured to couple to a switch of the current path; and
blanking circuitry coupled between the comparator and the driver stage and configured to:
mask the third signal for a first time period when a switching cycle begins;
detect spikes on a leading edge of said second signal based on the third signal; and
selectively mask said third signal for a second time period when a spike is detected.

2. The integrated circuit according to claim 1 wherein the blanking circuitry is configured to mask said third signal for the second time period when said blanking circuitry detects a spike on the leading edge of said second signal within said first time period.

3. The integrated circuit according to claim 2 wherein the third signal is variable between a low logic level and a high logic level and the blanking circuitry is configured to detect a spike on the leading edge of said second signal when, within said first time period, said third signal goes up from the low logic level to the high logic level.

4. The integrated circuit according to claim 1 wherein said switch is a power transistor.

5. The integrated circuit according to claim 1 wherein the blanking circuitry is configured to limit a number of time periods of masking of the third signal in each switching cycle to the first and the second time periods.

6. The integrated circuit according to claim 1 wherein said first time period has a duration based on an estimated maximum turn-on delay.

7. The integrated circuit of claim 1 wherein said second time period has a duration given by a duration of the detected spike.

8. The integrated circuit according to claim 6 wherein the blanking circuitry is configured to start the first time period in response to a clock signal.

9. The integrated circuit according to claim 8 wherein said second time period has a maximum duration equal to said first time period.

10. The integrated circuit according to claim 8 wherein the blanking circuitry comprises:
a set reset flip-flop configured to receive said clock signal at a set input;
an AND gate configured to receive an output from the set reset flip-flop and said third signal;
an OR gate configured to receive said clock signal and an output from said AND gate; and
a monostable device of the retriggerable type coupled to an output of the OR gate and configured to trigger the first time period and selectively trigger the second time period in each switching cycle.

11. The integrated circuit according to claim 1 wherein the blanking circuitry comprises:
a first monostable device of a non-retriggerable type configured to trigger the first time period; and
a second monostable device of the non-retriggerable type configured to trigger the second time period, said first time period having a duration different from a duration of said second time period.

12. The integrated circuit according to claim 11 wherein the blanking circuitry is configured to trigger said first time period when said driving signal has a positive edge.

13. The integrated circuit according to claim 11 wherein the blanking circuitry comprises:
an AND gate configured to receive an inverse of an output from the first monostable device of the non-retriggerable type and said third signal, wherein the first monostable device is configured to activate in response to a positive edge of said driving signal, and the second monostable device of the non-retriggerable type is configured to activate in response to a positive edge of an output of the AND gate; and
control logic configured to receive signals output from the first monostable device of the non-retriggerable type and from the second monostable device of the non-retriggerable type, and to generate a mask of the third signal in each switching cycle based on the output signals of the first monostable device and the second monostable device.

14. The integrated circuit of claim 13 wherein the control logic is configured to receive the third signal and to generate the mask of the third signal based on the output signals of the first monostable device, the output of the second monostable device and the third signal.

15. The integrated circuit according to claim 1 wherein the second time period has a duration based on an estimated maximum duration of a spike.

16. The integrated circuit according to claim 1 wherein the first time period has a fixed duration based on an estimated maximum duration of a turn-on time period and the second time period has a duration substantially equal to a duration of the detected spike.

17. The integrated circuit of claim 16 wherein the first and second time periods overlap.

18. The integrated circuit according to claim 1 wherein the switch is a power transistor of a switching power supply having an input voltage and an output voltage, the current of said current path being proportional to a rectified input voltage and said first signal being proportional to an error voltage between a reference voltage and a feedback voltage which is representative of the output voltage.

19. A system, comprising:
a rectifier configured to rectify alternating current signals;
a power transistor configured to open and close a current path coupled to the rectifier;
an output; and
a controller, the controller including:
a comparator configured to compare a first signal representative of a voltage error of the output with a second signal representative of a current flowing through the current path, and to generate a third signal having a logic level based on the comparison;
a driver stage configured to output a driving signal for the power transistor based on said third signal; and
a blanking circuit coupled between the comparator and the driver stage and configured to:

mask the third signal for a first time period when a switching cycle begins;

detect spikes on a leading edge of said second signal based on the third signal; and selectively mask said third signal for a second time period when a spike is detected.

20. The system of claim 19 wherein said first time period has a fixed duration longer than an estimated maximum turn-on time of the power transistor.

21. The system of claim 20 wherein the second time period has a duration given by a duration of the detected spike.

22. A device comprising:

means for comparing a first signal to a second signal and generating a logic signal based on the comparison, the second signal being representative of a current through a current path;

means for driving a switch in the current path based at least in part on the logic signal; and means for masking the logic signal coupled between the means for comparing and the means for driving, wherein the means for masking masks the logic signal for a turn-on-time-period when a switching cycle begins, detects spikes on leading edges of the second signal based on the logic signal, and selectively masks the logic signal for a spike-time-period when a spike in a leading edge of the second signal is detected.

23. The device of claim 22 wherein the means for masking includes means for detecting a spike.

24. The device of claim 22 wherein said turn-on-time-period has a fixed duration longer than an estimated maximum turn-on time of the switch.

25. The device of claim 22 wherein said spike-time-period has a fixed duration based on an estimated maximum duration of a spike.

26. The device of claim 22 wherein said spike-time-period has a duration given by a duration of a detected spike.

27. A method comprising:

comparing a first signal to a second signal, generating a logic signal, the second signal being representative of a current through a current path;

generating a driving signal to drive a switch in the current path based at least in part on the logic signal;

masking the logic signal for a turn-on-time-period in each cycle of the switch;

detecting spikes on a leading edge of the second signal based on the logic signal; and selectively masking the logic signal for a spike-time-period when a spike is detected on the leading edge of the second signal, wherein the comparing, the generating the driving signal and the masking are performed by one or more electronic devices.

28. The method of claim 27 wherein said turn-on-time-period has a fixed duration longer than an estimated maximum turn-on time of the switch.

29. The method of claim 27 wherein the masking the logic signal in each switching cycle is limited to one turn-on-time-period and one spike-time-period.

30. The method of claim 27 wherein said spike-time-period has a fixed duration based on an estimated maximum duration of a spike.

31. The method of claim 27 wherein said spike-time-period has a duration given by a duration of a detected spike.

32. The integrated circuit of claim 1 wherein the blacking circuitry comprises one or more monostable devices configured to trigger the first and second time periods.

33. The system of claim 19 wherein the blacking circuit comprises one or more monostable devices configured to trigger the first and second time periods.

\* \* \* \* \*